(12) United States Patent
Malzbender

(10) Patent No.: US 8,054,500 B2
(45) Date of Patent: Nov. 8, 2011

(54) ACQUIRING THREE-DIMENSIONAL STRUCTURE USING TWO-DIMENSIONAL SCANNER

(75) Inventor: Thomas Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1090 days.

(21) Appl. No.: 11/545,338

(22) Filed: Oct. 10, 2006

(65) Prior Publication Data

US 2008/0084589 A1   Apr. 10, 2008

(51) Int. Cl.
*H04N 1/04* (2006.01)
*G01B 11/00* (2006.01)

(52) U.S. Cl. ......... 358/1.6; 358/475; 702/152; 356/625

(58) Field of Classification Search .................... 358/1.6, 358/505, 509, 474, 475; 702/152, 153; 356/496, 356/625
See application file for complete search history.

(56) References Cited

U.S. PATENT DOCUMENTS

| | | | |
|---|---|---|---|
| 5,404,002 A * | 4/1995 | Tang | 235/462.32 |
| 5,694,235 A | 12/1997 | Kajiki | |
| 5,898,508 A | 4/1999 | Bekanich | |
| 6,297,834 B1 | 10/2001 | Malzbender | |
| 6,357,658 B1 * | 3/2002 | Garczynski et al. | 235/462.01 |
| 6,473,079 B1 * | 10/2002 | Kacyra et al. | 345/419 |
| 6,611,617 B1 * | 8/2003 | Crampton | 382/154 |
| 6,654,013 B1 | 11/2003 | Malzbender et al. | |
| 6,677,942 B1 * | 1/2004 | Rushmeier et al. | 345/420 |
| 6,842,265 B1 | 1/2005 | Votipka et al. | |
| 6,856,423 B2 | 2/2005 | Anderson et al. | |
| 6,888,544 B2 | 5/2005 | Malzbender et al. | |
| 6,906,314 B2 | 6/2005 | Harris et al. | |
| 6,940,063 B2 | 9/2005 | Spears et al. | |
| 6,947,666 B2 | 9/2005 | Chapman et al. | |
| 6,965,108 B2 * | 11/2005 | Bynum et al. | 250/341.1 |
| 7,019,872 B2 | 3/2006 | Haas et al. | |
| 7,064,872 B1 | 6/2006 | Jeran | |
| 7,068,402 B2 | 6/2006 | Witte et al. | |
| 2003/0085894 A1 * | 5/2003 | Tatsumi | 345/426 |
| 2003/0202095 A1 * | 10/2003 | Schultz | 348/142 |
| 2004/0008875 A1 * | 1/2004 | Linares | 382/124 |
| 2005/0219649 A1 | 10/2005 | Kim | |
| 2006/0045316 A1 * | 3/2006 | Hauke et al. | 382/116 |
| 2008/0137101 A1 * | 6/2008 | Spence et al. | 356/611 |

FOREIGN PATENT DOCUMENTS

WO      WO 9957597 A2 *  11/1999

OTHER PUBLICATIONS

Richard Schubert—Using a Flatbed Scanner as a Stereoscopic Near-Field Camera, IEEE Computer Graphics and Applications, vol. 20, No. 2, pp. 38-45, Mar. & Apr. 2000.*

* cited by examiner

*Primary Examiner* — Scott A Rogers

(57) ABSTRACT

One embodiment relates to a method of acquiring three-dimensional structure of an object using a flatbed scanner. The object is placed with a surface to be scanned facing down on a scanner platen. At least three images are obtained under differing lighting directions. The images are processed to generate the three-dimensional structure. Other features and embodiments are also disclosed.

19 Claims, 11 Drawing Sheets

Simultaneous registration and photometric stereo 600

$$e = \alpha n \cdot l$$

$$L = (l_1^T, l_2^T, \ldots l_m^T)^T$$

$$E = (e_1, e_2, \ldots e_m)^T$$

$$n' = L^+ E$$

$$n = \frac{n'}{\alpha}$$

FIG. 7A

ACQUIRING THREE-DIMENSIONAL STRUCTURE USING TWO-DIMENSIONAL SCANNER

BACKGROUND

1. Field of the Invention

The present application relates generally to apparatus and methods of image scanning.

2. Description of the Background Art

Scanner devices, such as a flatbed scanner, produce machine-readable image data signals that are representative of a scanned two-dimensional object, typically a photograph or a page of printed text. In a typical scanner application, the image data signals produced by a flat bed scanner may be used by a computer system to reproduce an image of the scanned two-dimensional object on a suitable display device, such as a cathode ray tube ("CRT") or liquid crystal display ("LCD"). The computer system may also print an image of the two-dimensional object on a printer connected to the computer system.

It is highly desirable to improve capabilities of scanner devices and image scanning systems.

SUMMARY

One embodiment relates to a method of acquiring three-dimensional structure of an object using a flatbed scanner. The object is placed with a surface to be scanned facing down on a scanner platen. At least three images are obtained under differing lighting directions. The images are processed to generate the three-dimensional structure.

Another embodiment relates to an apparatus configured to be able to acquire three-dimensional information from an object being scanned. The apparatus includes at least a scanner platen upon which the object is placed, an object-imaging device configured to obtain two-dimensional images of the object, and computer-readable control code. The computer-readable control code is configured to use the object-imaging device to obtain at least three images under differing lighting directions.

Another embodiment relates to a scanner that obtains three-dimensional information from an object being scanned. The scanner includes at least a scanner platen upon which the object is placed, an object-imaging device configured to obtain two-dimensional images of the object, and computer-readable control code. The object-imaging device includes two light sources, each light source providing a differing lighting direction. The computer-readable control code is configured to cause first and second scans of the object by the object-imaging device, each using a different one of the light sources, and is further configured to cause, after rotation of the object, third and fourth scans of the object by the object-imaging device, each using a different one of the light sources.

Other features and embodiments are also disclosed.

BRIEF DESCRIPTION OF THE DRAWINGS

FIG. 7A is a diagram depicting equations of a photometric stereo computation in accordance with an embodiment of the invention.

DETAILED DESCRIPTION

Two-Dimensional Scanner

Figure 1:
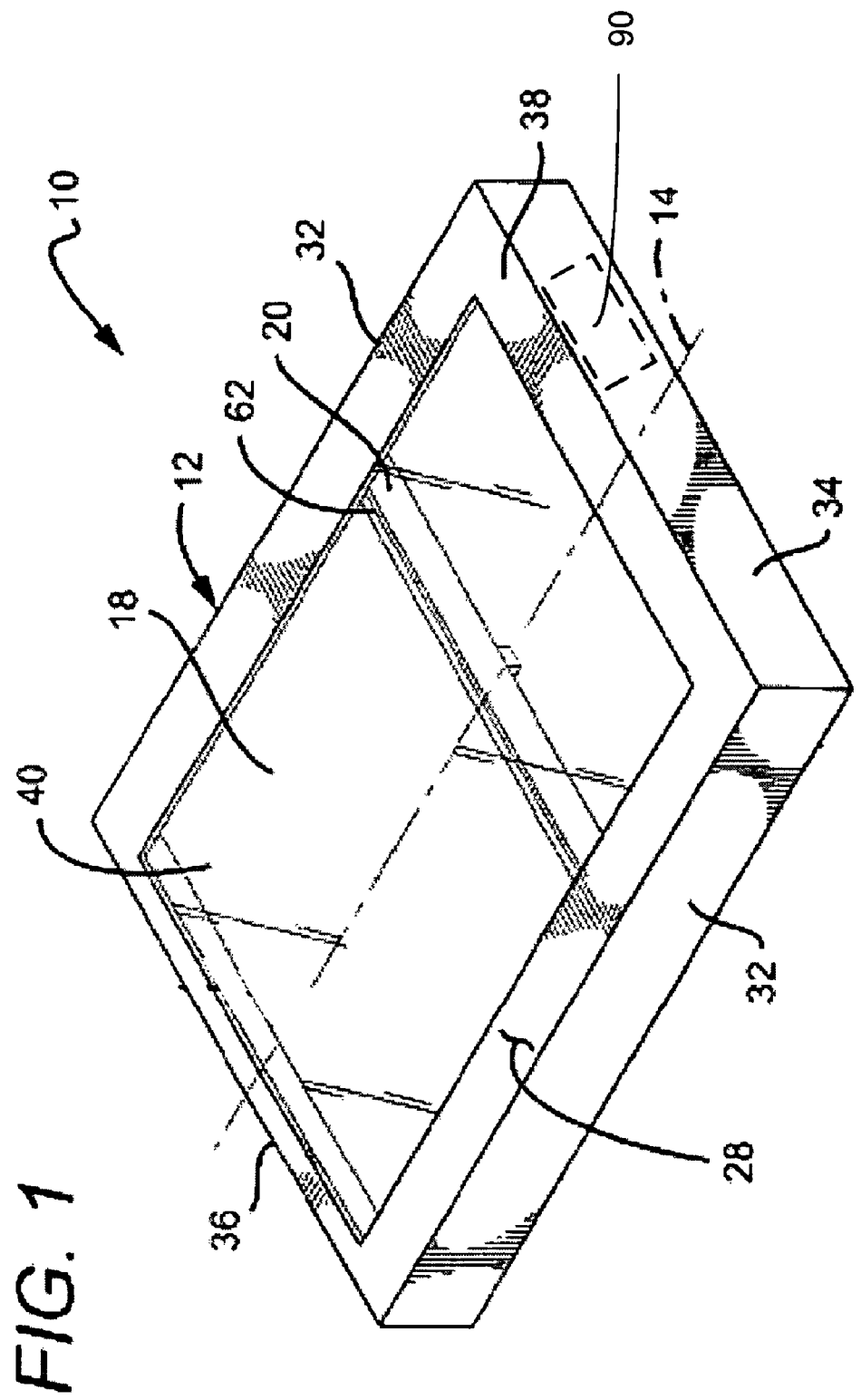
FIG. 1 is a perspective view of a portion of a flatbed two-dimensional scanner.
Figure 2:
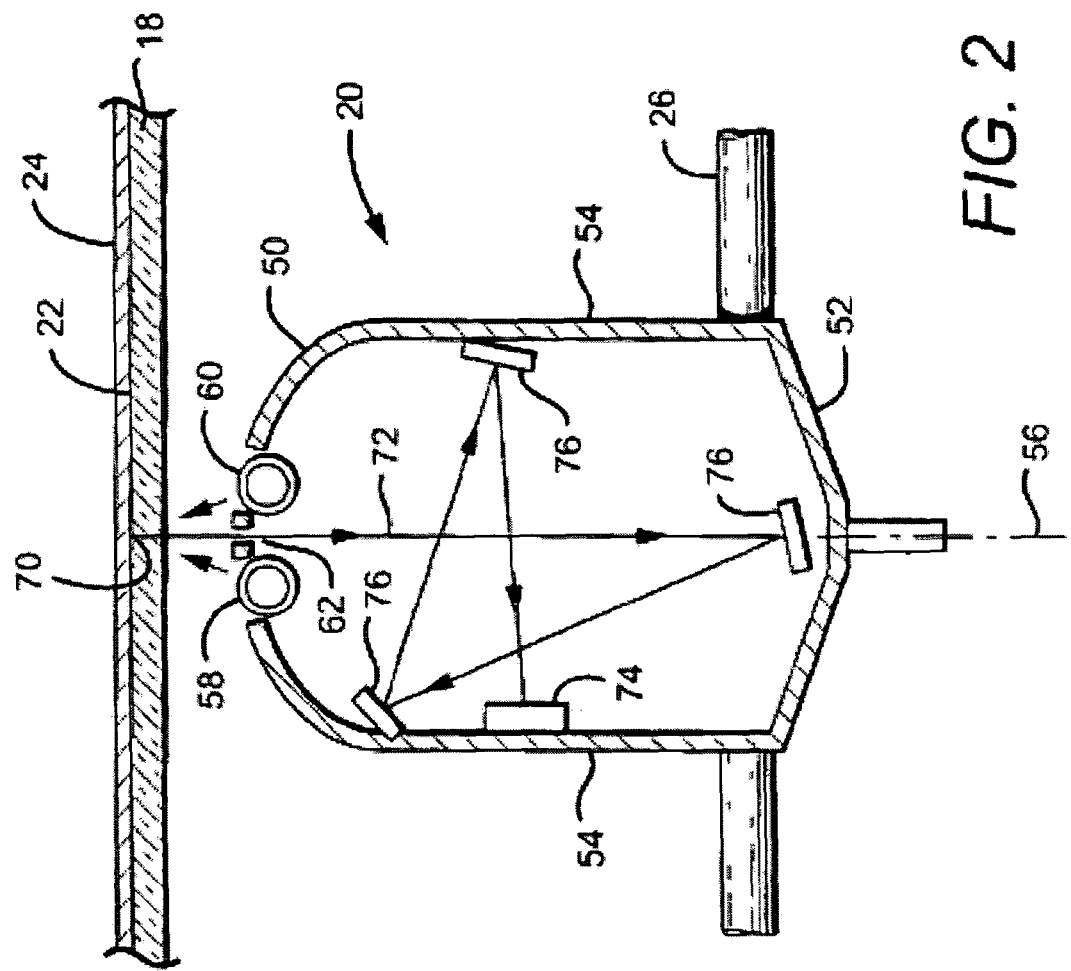
FIG. 2 is a side elevation view, in cross-section, of a movable object-imaging device forming part of the flatbed scanner of FIG. 1.

With reference to FIGS. 1 and 2, there is shown in schematic form an example of a flatbed two-dimensional scanner 10. The flatbed scanner 10 includes a housing 12 extending along a longitudinal direction 14, a transparent platen 18 supported by the housing 12 and a transversely-extending object-imaging device 20 under the platen. The platen has a planar, object supporting top surface 22 defining the image plane of an object such as a document 24 to be scanned. The object-imaging device 20 is adapted to be driven linearly along a pair of spaced-apart, parallel, longitudinally extending rails 26. For simplicity of illustration, the carriage drive, the hinged scanner housing cover and other features are not shown.

The housing 12 is typically a rectangular structure and includes a top wall 28, a bottom wall 30, side walls 32, and front and back walls 34 and 36, respectively. The housing 12 may include a front portion 38 adjacent to the front wall 34 adapted to enclose the scanner control system 90. The top wall 28 of the housing 12 typically has a rectangular opening or frame 40. The perimeter of the platen 18 is attached to the top wall 28 of the housing about the rectangular frame 40.

The object-imaging device 20, in accordance with one, specific, exemplary embodiment thereof, is depicted in FIG. 2. The object-imaging device 20 includes an enclosure having an upper convex wall 50, a lower wall 52, and opposed, side walls 54. The device enclosure may be, as in this example, symmetrical about a central axis 56 intercepting the upper and lower walls. Disposed adjacent the upper wall 50 of the device enclosure is a light source comprising a pair of parallel, longitudinally spaced apart, transversely-extending light sources 58 and 60. These light sources may be implemented, for example, using tubular lamps or other light producing devices. The upper wall 50 of the device enclosure further defines a transverse light-receiving slit or aperture 62 positioned between the light sources 58 and 60.

During conventional 2D scanning, the lower surface of an object such as the document 24 placed on the top surface 22 of the platen 18 is illuminated along a transverse linear strip or scan line 70 by both of the light sources 58 and 60. A beam 72 of light reflected from the illuminated scan line extends along the central axis 56 and passes through the light-receiving aperture 62 to a photodetector array 74 via a system of mirrors 76. The photodetector array 74 may be, for example, a linear charge-coupled device (CCD) array.

Acquiring Three-Dimensional Structure

The present application discloses a method of obtaining three-dimensional (3D) information about the surface of a physical object. In accordance with an embodiment of the invention, the method may obtain the 3D information using the 2D scanner apparatus hardware described above in relation to FIGS. 1 and 2, with certain modifications to the control software for such a 2D scanner. Some additional user action may also be required to rotate the object. Alternate embodiments may utilize different scanner apparatus.

Figure 3:
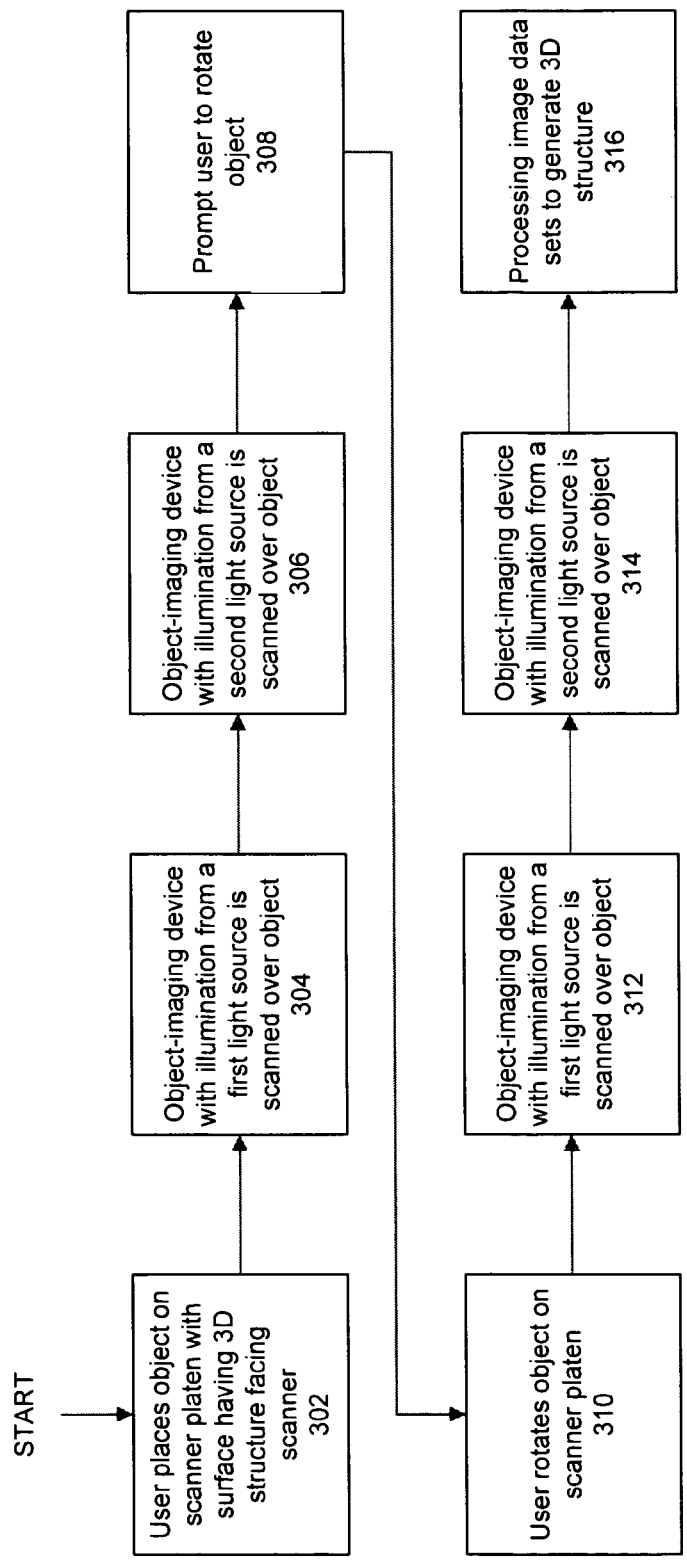
FIG. 3 is a flow chart of a method for acquiring 3D structure using 2D scanner hardware in accordance with an embodiment of the invention.
Figure 4A:
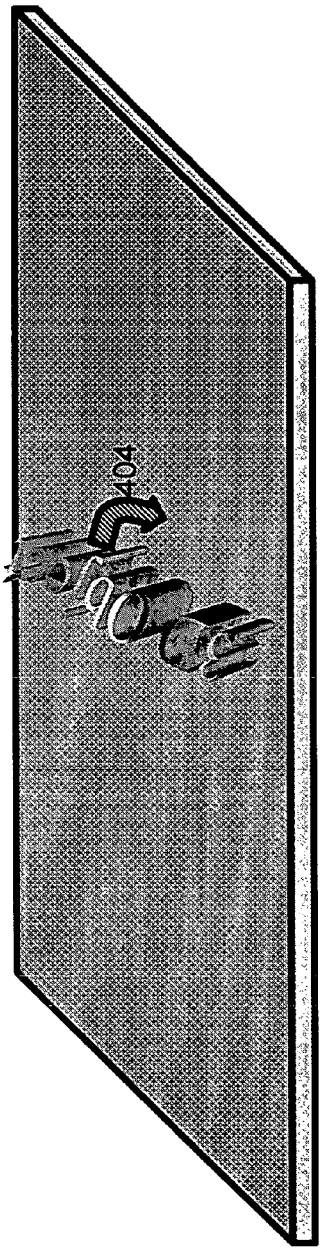
FIGS. 4A and 4B are illustrations of the technique from a user's point of view.
Figure 4B:
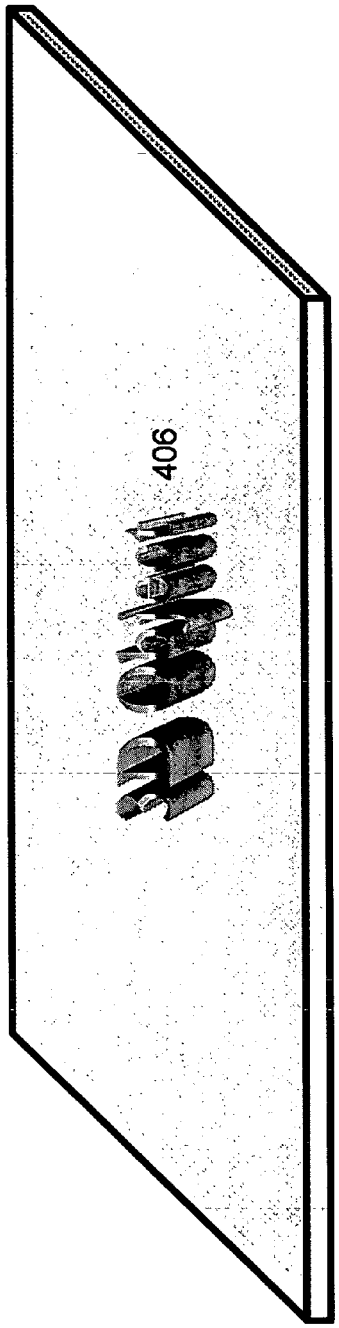

FIG. 3 is a flow chart of a method 300 for acquiring 3D structure using 2D scanner hardware in accordance with an embodiment of the invention. FIGS. 4A and 4B are illustrations of the technique from a user's point of view.

With reference to the first block 302 in FIG. 3 and FIG. 4A, a user places an object 402 with 3D structure on the scanner platen 18. The object 402 is placed with the side having the 3D structure of interest facing down on the scanner platen 18. In other words, the object 402 is placed with the 3D structure to be scanned facing towards the object-imaging device 20. Two scans are then performed by the scanner 10 with the object 402 in this position.

With reference to the second block 304 in FIG. 3, in the first scan, only a first transversely-extending light source (for example, light source 58) is turned on, while a second transversely-extending light source (for example, light source 60) is off. During the scan, the object-imaging device 20 is moved along the longitudinal direction 14 across the object 402 while a first set of image data is obtained from the photodetector array 74.

With reference to the third block 306 in FIG. 3, in the second scan, only the second transversely-extending light source (for example, light source 60) is turned on, while the first transversely-extending light source (for example, light source 58) is off. During the scan, the object-imaging device 20 is moved along the longitudinal direction 14 across the object 402 while a second set of image data is obtained from the photodetector array 74.

Note that the steps of the second block 304 and third block 306 may be reversed. In other words, the second set of image data may be obtained first, and the first set of image data may be obtained next.

Together, the first and second sets of image data comprise a first pair of scanned images. The change in the angle of illumination from the first scanned image (the first set of image data) to the second scanned image (the second set of image data) is known because it is determined by the geometry of the object-imaging device 20 and the scanner 10.

With reference to the fourth block 308 of FIG. 3, the user may be prompted to rotate the object. For example, the prompt may comprise a message on a display screen of the scanner 10 or of a computer coupled to the scanner 10. In another example, the prompt may be an audio message. In accordance with an embodiment of the invention, the message may indicate that the user is to rotate the object by an approximate angle. In a preferred embodiment, the message may indicate that the user is to rotate the object by approximately ninety degrees in a clockwise (or alternatively, in a counter-clockwise) direction.

With reference to the fifth block 310 of FIG. 3 and FIGS. 4A and 4B, the user rotates 404 the object 402 by an angle. The rotation 404 is such that the 3D structure of interest still faces down on the scanner platen 18 after the rotation 404. An illustration of the rotated object 406 is shown in FIG. 4B. In accordance with an embodiment of the invention, the user does not have to achieve a precise rotation angle for the method 300 to work. As described below, the precise angle may be determined by minimizing a prediction error. Two additional scans (third and fourth scans) are then performed by the scanner 10 on the rotated object 406.

With reference to the sixth block 312 in FIG. 3, in the third scan, only the first transversely-extending light source (for example, light source 58) is turned on, while the second transversely-extending light source (for example, light source 60) is off. During the scan, the object-imaging device 20 is moved along the longitudinal direction 14 across the rotated object 406 while a third set of image data is obtained from the photodetector array 74.

With reference to the seventh block 314 in FIG. 3, in the fourth scan, only the second transversely-extending light source (for example, light source 60) is turned on, while the first transversely-extending light source (for example, light source 58) is off. During the scan, the object-imaging device 20 is moved along the longitudinal direction 14 across the rotated object 406 while a fourth set of image data is obtained from the photodetector array 74.

Note that the steps of the sixth block 312 and seventh block 314 may be reversed. In other words, the fourth set of image data may be obtained first, and the third set of image data may be obtained next.

Together, the third and fourth sets of image data comprise a second pair of scanned images. The change in the angle of illumination from the third scanned image (the third set of image data) to the fourth scanned image (the fourth set of image data) is known because it is determined by the geometry of the object-imaging device 20 and the scanner 10.

With reference to the eighth block 316 in FIG. 3, the four sets of image data are processed to generate a 3D structure. This data processing is described further below.

Figure 5:
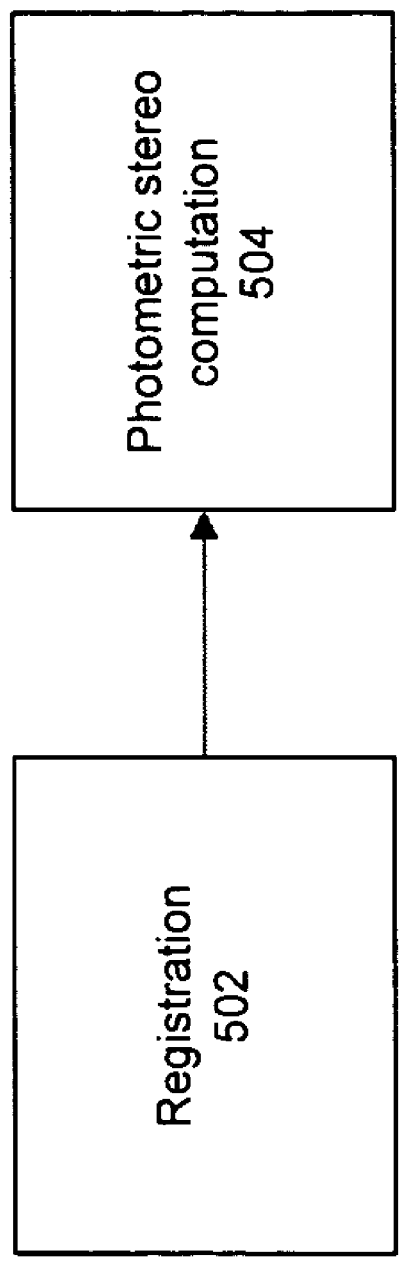
FIG. 5 is a flow chart depicting a method of determining 3D structure from the multiple 2D scans in accordance with an embodiment of the invention.

FIG. 5 is a flow chart depicting a method 500 of determining 3D structure from the multiple 2D scans in accordance with an embodiment of the invention. This method 500 involves registration followed by photometric stereo calculations. Hence, this method 500 may be considered as performing "sequential" registration and photometric stereo.

With reference to the first block 502, the first and second pairs of scanned images may be registered or aligned. For example, the two pairs of scanned images may be manually registered by a user via a user interface. In one implementation, for example, a software tool may be provided such that the user may translate and rotate an image from the first pair until it is visually registered with an image from the second pair.

With reference to the second block 504, with the four images registered (aligned) to achieve a stationary pose requirement of the photometric stereo technique, the photometric stereo calculations may now be performed. A diagram depicting equations of such a photometric stereo computation is given in FIG. 7A, which is discussed further below. From the photometric stereo computation, surface normals (orientations) and surface albedo may be recovered on a per pixel basis. Surface albedo refers to the amount of light reflected in each color channel after removing geometric effects.

Figure 6:
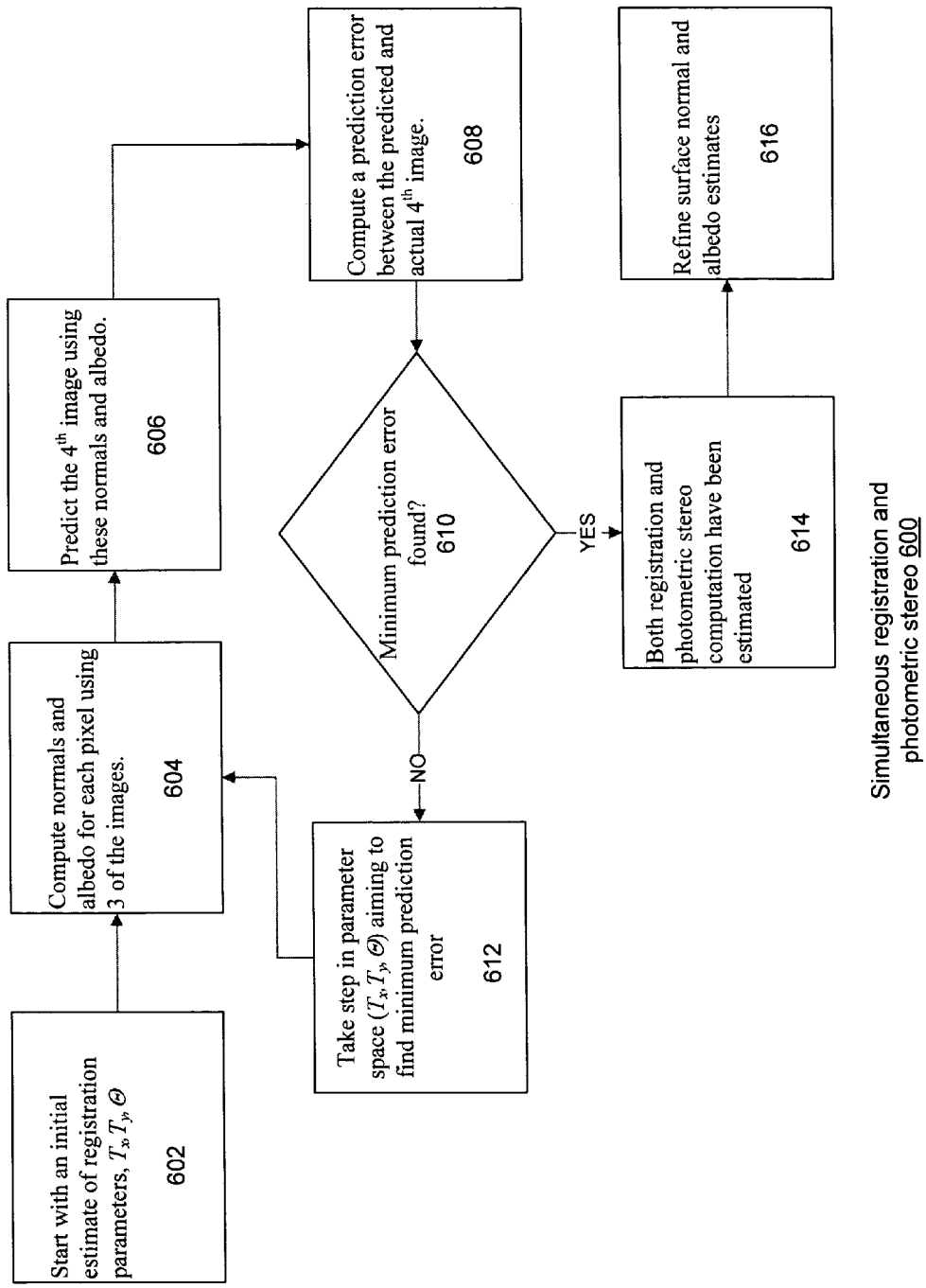
FIG. 6 is a flow chart depicting a method of determining 3D structure from the multiple 2D scans in accordance with another embodiment of the invention.

FIG. 6 is a flow chart depicting a method 600 of determining 3D structure from the multiple 2D scans in accordance with another embodiment of the invention. This method 600 may be advantageously automated using software code and involves minimizing predicted error from photometric stereo calculations so as to determine registration. Hence, this method 600 may be considered as performing "simultaneous" registration and photometric stereo.

With reference to the first block 602, the procedure starts with an initial estimate of the registration parameters. The registration parameters include x and y translation parameters, Tx and Ty, which indicates the x-y translation of the object between the two pairs of scans. The registration parameters also include an angle of rotation, Θ, which indicates the rotation of the object between the two pairs of scans.

For example, in one implementation, the user is prompted to rotate the object by ninety degrees clockwise between the two pairs of scans. In that implementation, the initial estimate of the registration parameters may be Tx=0, Ty=0, and Θ=90 degrees. In other words, in that implementation, the initial estimate may be no translation and 90 degree rotation.

With reference to the second block 604, using the current estimate of the registration parameters, photometric stereo calculations may be performed using three of the four images to compute surface normals and surface albedos for each pixel. For example, the first, second and third sets of image data may be used to compute per pixel surface normals and albedo. In another example, the second, third and fourth sets of image data may be used to compute per pixel surface normals and albedo.

With reference to the third block 606, the surface normals and surface albedo, along with the initial estimate of the registration parameters, may be used to generate a prediction of the remaining set of image data. A diagram depicting equations of such a photometric stereo computation is given in FIG. 7A, which is discussed further below. For example, if the first, second and third sets of image data were used to compute per pixel surface normals and albedo, then a prediction may be generated for the fourth set of image data. In another example, if the second, third and fourth sets of image data may be used to compute per pixel surface normals and albedo, then a prediction may be generated for the first set of image data.

With reference to the fourth block 608, a prediction error is computed between the prediction of the remaining set of image data and the actual remaining set of image data. For example, if the first, second and third sets of image data were used to compute per pixel surface normals and albedo, then a prediction error is computed between the predicted fourth set of image data and the actual fourth set of image data. In one implementation, the prediction error may be a squared sum of differences in color values between the predicted and actual image pixels.

Figure 7B:
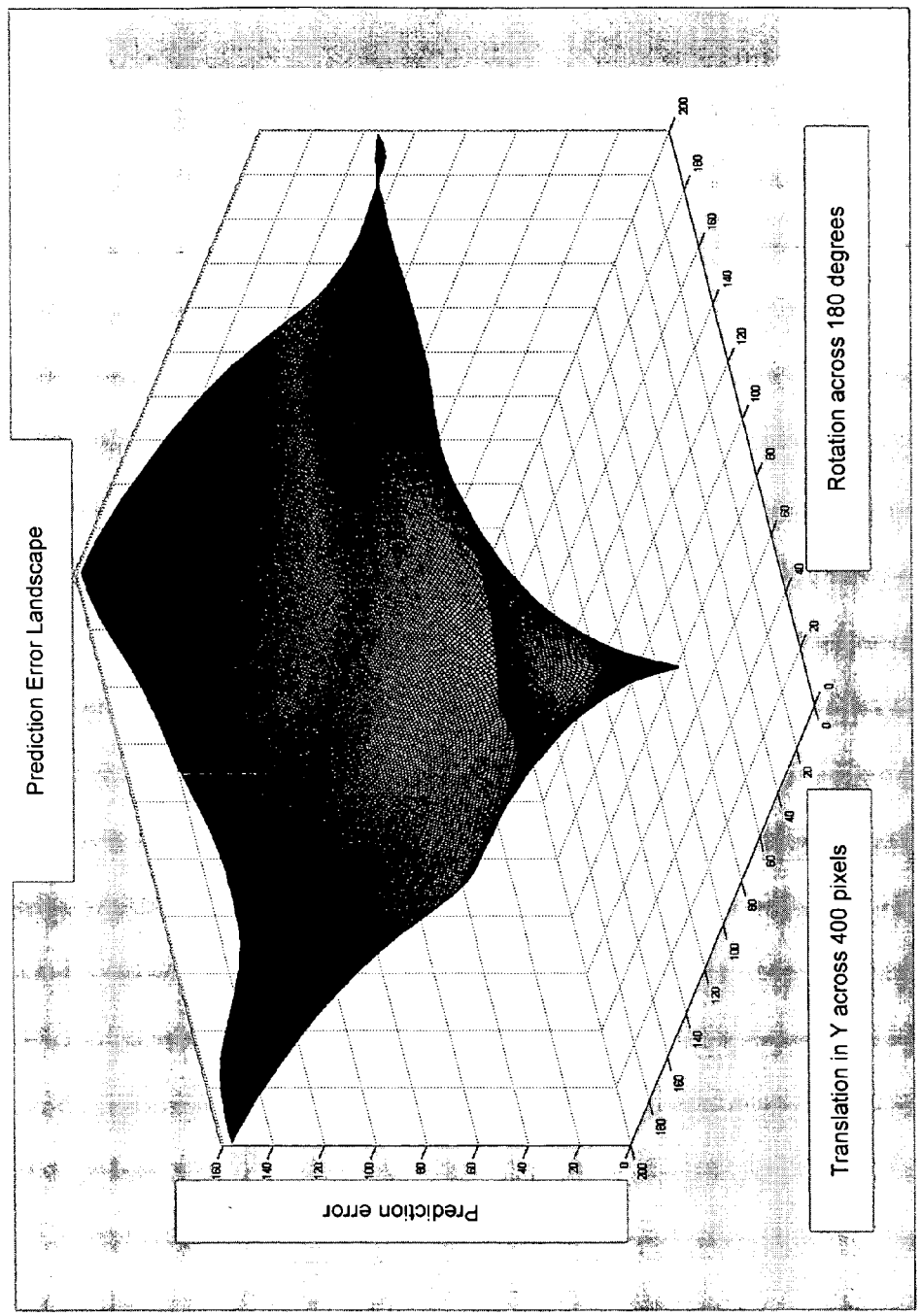
FIG. 7B depicts an example prediction error landscape in two-dimensional parameter space.

With reference to the fifth block 610, a determination is made as to whether the minimum prediction error has been found in the three-dimensional parameter space (two dimensions of translation and one dimension of rotation). An illustration of an example prediction error landscape in a two-dimensional parameter space is shown in FIG. 7B, which is discussed further below.

With reference to the sixth block 612, if it has not been determined that the minimum prediction error has been found, then a step is taken in parameter space aiming to find the minimum prediction error (and the parameters corresponding thereto).

In accordance with one embodiment of the invention, a compass search technique may be employed to find the minimum prediction error in parameter space. Other search techniques may be used in other embodiments. Other search techniques include Levenberg-Marquardt, Gradient Descent, Conjugant Gradient, Neider-Mead, Gauss-Newton, Netwon and other techniques.

After the step in the sixth block 612, the method 600 loops back to the step in block 604 where the photometric stereo calculations are performed, and so on. In other words, the search continues in parameter space to aiming to find the minimum prediction error.

With reference to the seventh block 614, if it is determined that the minimum prediction error has been found per block 610, then the best estimate of the registration of the object between the two pairs of images is given by the point in parameter space corresponding to the minimum prediction error. In addition, the estimated surface normals and albedo are those computed at the point in parameter space corresponding to the minimum prediction error.

With reference to the eighth block 616, the surface normal and albedo estimates may be modified or refined once the best estimate of the registration has been found.

One technique that may be applied for refining the surface normal and albedo estimates is to compute the final surface normals and albedo with a more accurate estimate of the rotation of the object. For lighting direction during the iteration, the computation may assume a specific (for example, 90 degree) rotation of the object, and hence the computation is made assuming that specific angle between lighting directions. After convergence, a more accurate estimate of the rotation (and hence the lighting) is determined (for example, 89 degrees). This more accurate estimate may be used to re-compute the final surface normals and albedo.

Another technique that may be applied for refining the surface normal and albedo estimates is to compute the albedo using just one set of lighting directions, instead of two lighting directions. This appears to be beneficial in that the effect any mis-registration between the two scans is prevented from adversely affecting the Albedo image.

While the above-discussed method 600 of determining 3D structure from the multiple 2D scans is in accordance with an embodiment of the invention, some of the steps may be varied and/or additional steps may be added in other embodiments.

For example, in accordance with a preferred embodiment of the invention, the photometric stereo calculation in block 604 may be performed using all four possible groupings of three of four images so as to generate predicted surface normals and albedo for each of the four images. Predictions may then be made as to each of the four images in block 606. The prediction error in block 606 may then be computed by comparing the predicted and actual pixel values for all four of the images.

In another example, in accordance with an embodiment of the invention, if the simultaneous registration and photometric stereo method 600 fails (for example, does not converge at a minimum prediction error), then the sequential registration and photometric stereo method 500 may be used. In that case, manual registration by a user may be performed via a user interface, followed by the photometric stereo computation.

FIG. 7A is a diagram depicting equations of a photometric stereo computation in accordance with an embodiment of the invention. Given three or more images of a surface under known, but different, lighting directions, surface orientation (normals) and surface albedo may be recovered using such photometric stereo computation.

Given a normalized vector pointing at each light, l, and a unit normal vector, n, a diffuse surface with albedo α will have brightness e. One may recover an unknown surface orientation vector n' by multiplying the inverse matrix of light directions, $L^+$, by a vector of measured brightness values per pixel, E. One way to computer $L^+$ from the matrix of lighting directions, L, is by taking the Moore-Penrose pseudoinverse of L. The surface orientation vector n' may then be normalized to recover the surface normal n.

FIG. 7B depicts an example prediction error landscape in a two-dimensional parameter space. The vertical dimension (height) depicts the prediction error in dependence on translation in the y-dimension and rotation of the object. So as to visually depict such a prediction error landscape, only a two dimensional surface is shown. The translation in the x-dimension being kept fixed for purposes of this illustration.

Figure 8:
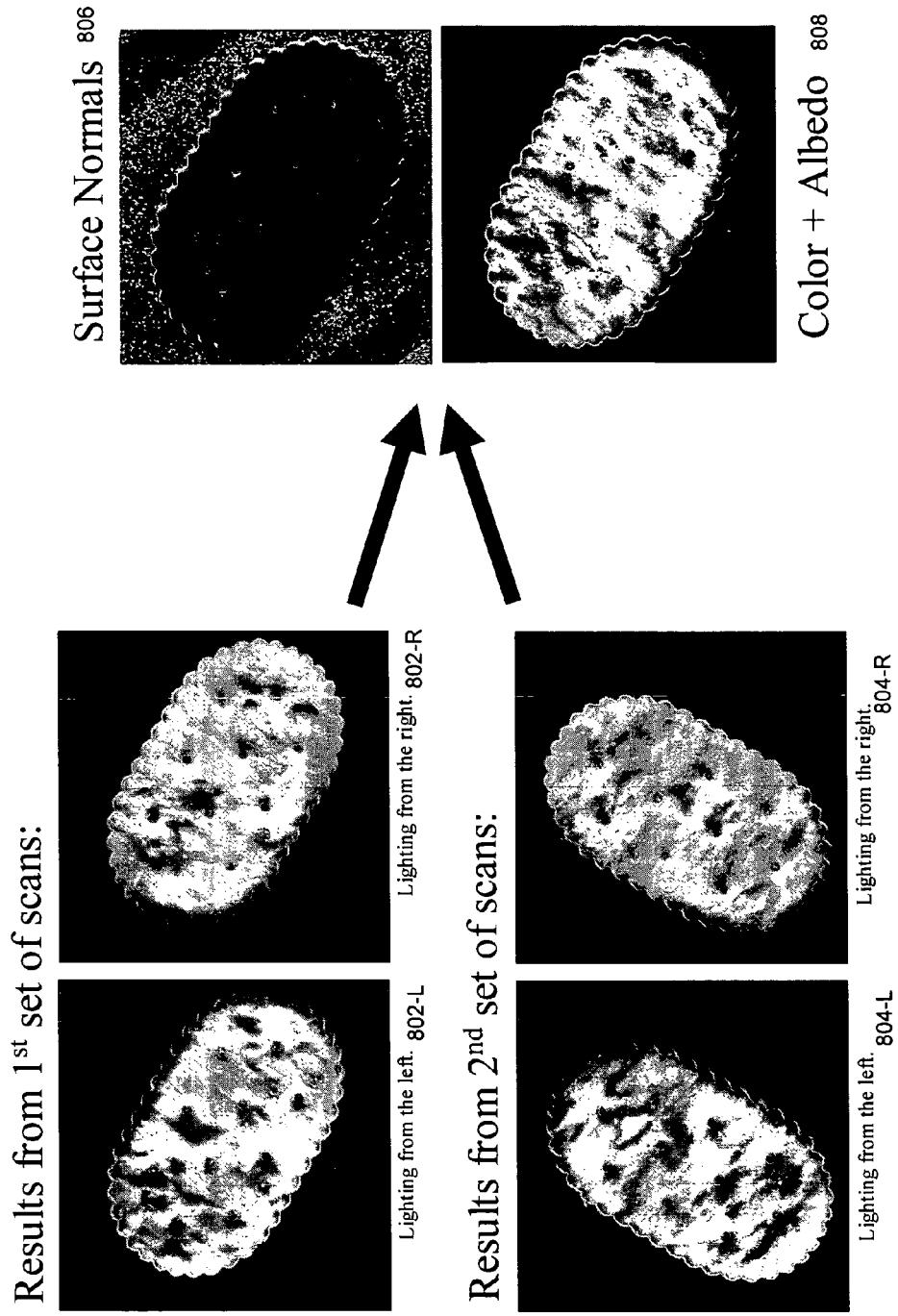
FIG. 8 depicts an example of acquiring 3D structure in accordance with an embodiment of the invention.

FIG. 8 depicts an example of acquiring 3D structure in accordance with an embodiment of the invention. Here, the object is a small cracker.

The two images 802 resulting from the first pair of scans are shown in the upper left of FIG. 8. The first image 802-L is obtained with lighting from a left source, and the second image 802-R is obtained with lighting from a right source.

After rotating the cracker, the two images 804 from the second pair of scans are shown in the lower left of FIG. 8. The third image 804-L is obtained with lighting from a left source, and the fourth image 804-R is obtained with lighting from a right source.

After the registration and photometric stereo computation (either sequential or simultaneous), the resulting outputs may include surface normals 806 and color+albedo 808, in addition to the four registered images under different lighting conditions.

Note that the 3D structure obtained has a depth of field which depends on the depth-of-field of the object-imaging device. For example, the object-imaging device may have a depth-of-field of about one centimeter. In that case, the depth-of-field of the 3D structure obtained would also be about one centimeter.

In an alternate embodiment of the invention, instead of having a user rotate the object between pairs of scans, the 2D scanner apparatus may be configured so as to be able to obtain three images under differing lighting directions. Obtaining at least three images under differing lighting directions avoids the need for rotation of the object.

For example, the scanner apparatus may be configured such that the object-imaging device may be rotated. For instance, the object-imaging device may be rotated by ninety degrees. In that case, instead of having a user rotate the object, the object-imaging device may be rotated by ninety degrees after the first pair of scans and before taking at least a third scan. As a further advantage of such an apparatus, knowing the angle of rotation with precision facilitates registration of the images.

In another example, the scanner apparatus may be configured with a second object-imaging device. For instance, the second object-imaging device may scan the object at a ninety-degree angle to the first object-imaging device. In that case, instead of having a user rotate the object, the first object-imaging device may perform the first pair of scans and the second object-imaging device may perform at least a third scan. Again, as a further advantage of such an apparatus, knowing the angle of rotation with precision facilitates registration of the images.

Example Applications Using 3D Structure

In one application, the 3D-structure outputs may be used to derive parametric texture maps (PTMs). PTMs are described, for example, in U.S. Pat. No. 6,654,013, entitled "Apparatus for and Method of Enhancing Shape Perception with Parametric Texture Maps", with inventors Thomas Malzbender et al., and U.S. Pat. No. 6,888,544, entitled "Apparatus for and Method of Rendering 3D Objects with Parametric Texture Maps," with inventors Thomas Malzbender et al. The disclosures of U.S. Pat. Nos. 6,654,013 and 6,888,544 are hereby incorporated by reference.

Figure 9:
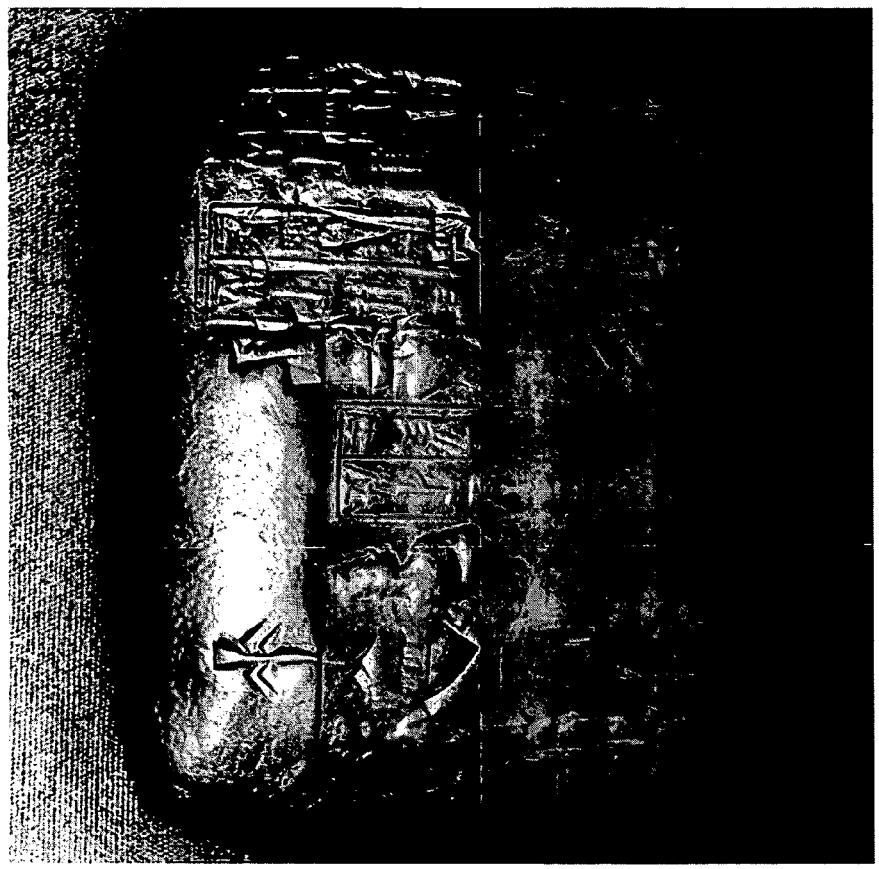
FIG. 9 shows an example of such image-based relighting.

PTMs may be used to perform image-based relighting in which a user may interactively control lighting and material properties of an object. FIG. 9 shows an example of such image-based relighting. The top and bottom halves of the object are shown as if they had different image properties.

Figure 10:
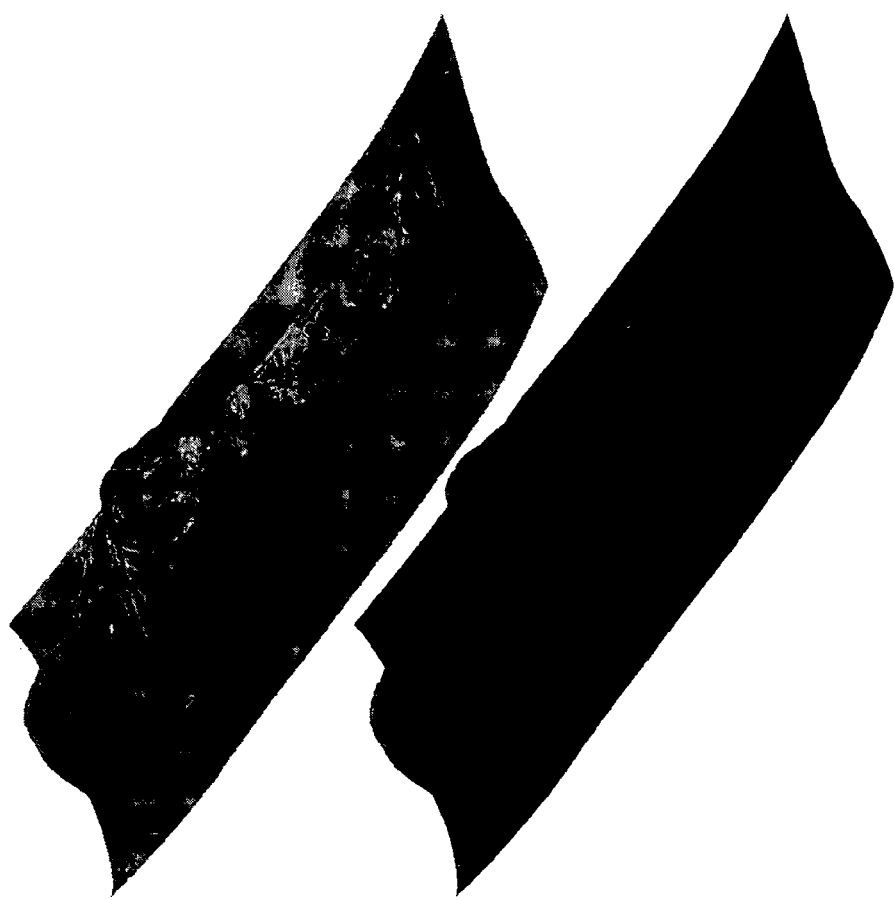
FIG. 10 shows an example of geometry recovery from surface normals.

In another application, the 3D-structure outputs (in particular, the surface normals) may be used to recover the geometry of the object. FIG. 10 shows an example of geometry recovery from surface normals. The geometry may be recovered by integrating the normal field.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of acquiring a three-dimensional structure of an object using a flatbed scanner, the method comprising:
    placing the object with a surface to be scanned facing down on a scanner platen;
    obtaining a first image using a first of two light sources of an optical-imaging device;
    obtaining a second image using a second of the two light sources of the optical-imaging device;
    obtaining a third image using one of the two light sources of the optical-imaging device, wherein the object position is changed relative to the optical-imaging device; and
    processing the images to generate the three-dimensional structure.

2. The method of claim 1, wherein the two light sources of the optical-imaging device each provide a differing lighting direction.

3. The method of claim 2, wherein obtaining the first image and the second image includes first and second scans, respectively, each scan using a different one of the light sources.

4. The method of claim 1, the object position is changed relative to the optical-imaging device further includes rotating the object after the second scan.

5. The method of claim 4, wherein obtaining the images further includes, after said object rotation, third and fourth scans, each using a different one of the light sources further comprising obtaining a fourth image after obtaining the third image using the other of the two light sources of the optical-imaging device.

6. The method of claim 1, wherein processing the images includes registration of the images and photometric stereo computation.

7. The method of claim 6, wherein said registration of the images and photometric stereo computation are performed sequentially.

8. The method of claim 6, wherein said registration of the images and photometric stereo computation are, performed simultaneously.

9. The method of claim 8, further comprising finding registration parameters which minimize a prediction error between a predicted fourth image and an obtained fourth image.

10. The method of claim 9, wherein the prediction error comprises a measured difference between the predicted fourth image and the obtained fourth image.

11. The method of claim 10, wherein the measured difference comprises a squared sum of differences.

12. An apparatus configured to be able to acquire three-dimensional information from an object being scanned, the apparatus comprising:
   a scanner platen upon which the object is placed;
   an object-imaging device having an enclosure and two light sources, the two light sources define a transverse light-receiving aperture in the enclosure between the two light sources, each light source oriented to separately illuminate the object from a different direction such that light reflected from the object passes through the aperture to a photodetector array located within the enclosure to obtain a different two-dimensional image of the object; and
   computer-readable control code configured to use the object-imaging device to obtain at least three images under differing lighting directions.

13. The apparatus of claim 12, wherein said computer-readable control code is configured to cause first and second scans of the object by the object-imaging device, each using a different-one of the two light sources.

14. The apparatus of claim 13, wherein said computer-readable control code is configured to cause, after rotation of said object, third and fourth scans of the object by the object-imaging device, each using a different one of the two light sources.

15. The apparatus of claim 14, further comprising computer-readable processing code configured to perform registration of the images and photometric stereo computation.

16. The apparatus of claim 15, wherein said registration of the images and photometric stereo computation are performed simultaneously.

17. The apparatus of claim 16, wherein the computer-readable processing code is further configured to find registration parameters which minimize a prediction error between a predicted fourth image and an obtained fourth image.

18. A scanner that obtains three-dimensional information from an object being scanned, the scanner comprising:
   a scanner platen upon which the object is placed;
   an object-imaging device configured to obtain two-dimensional images of the object, wherein the object-imaging device includes an enclosure and two light sources, the two light sources define a transverse light-receiving aperture in the enclosure between the two light sources, each light source providing a different lighting direction such that light reflected from the object passes through the aperture to a photodetector array located within the enclosure to obtain a different image of the object; and
   computer-readable control code configured to cause first and second scans of the object by the object-imaging device, each using a different one of the light sources, and further configured to cause, after rotation of the object, third and fourth scans of the object by the object-imaging device, each using a different one of the light sources.

19. The scanner of claim 18, further comprising computer-readable processing code configured to perform simultaneous registration of the images and photometric stereo computation.

* * * * *

UNITED STATES PATENT AND TRADEMARK OFFICE
CERTIFICATE OF CORRECTION

PATENT NO. : 8,054,500 B2  
APPLICATION NO. : 11/545338  
DATED : November 8, 2011  
INVENTOR(S) : Thomas Malzbender Page 1 of 1

It is certified that error appears in the above-identified patent and that said Letters Patent is hereby corrected as shown below:

In column 9, line 30, in Claim 13, delete "different-one" and insert -- different one --, therefor.

Signed and Sealed this
Fourth Day of December, 2012

David J. Kappos
*Director of the United States Patent and Trademark Office*